United States Patent

[11] 3,589,780

| | | |
|---|---|---|
| [72] | Inventor | Joseph Arthur Thompson<br>Chawn Hill, Stourbridge, England |
| [21] | Appl. No. | 824,052 |
| [22] | Filed | May 13, 1969 |
| [45] | Patented | June 29, 1971 |
| [73] | Assignee | G.K.N. Engineering Limited<br>Wolverhampton, England |

[54] BEARINGS
6 Claims, 2 Drawing Figs.

[52] U.S. Cl. .................................................. 308/122
[51] Int. Cl. .................................................. F16c 1/24
[50] Field of Search ........................................ 308/DIG. 1, 122, 9, 121, 70, 168, 172

[56] References Cited
UNITED STATES PATENTS

| 2,711,934 | 6/1955 | Rickenmann ............. | 308/122 |
| 3,391,965 | 7/1968 | Lindeboom ............... | 308/172 |
| 3,476,451 | 11/1969 | Schwartzman ............ | 308/122 |

Primary Examiner—Fred C. Mattern, Jr.
Assistant Examiner—Frank Susko
Attorney—Friedman & Goodman ABSTRACT: A bearing which includes an inner member having an externally coned portion, an outer member, a sleeve located between the coned portion and the outer member, the sleeve having an internal coned surface, corresponding to the surface of the coned portion and the sleeve being urged into engagement with the coned portion by fluid pressure to provide automatic adjustment for radial wear.

BEARINGS

BACKGROUND OF THE INVENTION

1. Field of the Invention

The invention relates to bearing assemblies of the kind including a pair of relatively rotatable members disposed one within the other.

2. Description of the Prior Art

Many forms of bearing assembly have previously been provided and in which a bearing liner has been located between the inner member and the outer member and such bearing assemblies have included provision for the supply of lubricant.

It is an object of the present invention to provide an improved bearing assembly which will be free, or substantially free from radial clearance and in which there is provided automatic continuous adjustment for radial wear.

SUMMARY OF THE INVENTION

The inner member of the bearing assembly of the present invention has an externally coned portion and the outer member supports a correspondingly internally coned sleeve which is fixed against rotation relative to the outer member but is movable axially relative thereto. The sleeve provides a bearing for the coned portion and means are provided for supplying fluid under pressure to act on said sleeve to bias it into bearing engagement with the coned portion so as to take up radial wear therebetween.

DESCRIPTION OF THE PREFERRED EMBODIMENT

Figure 1:
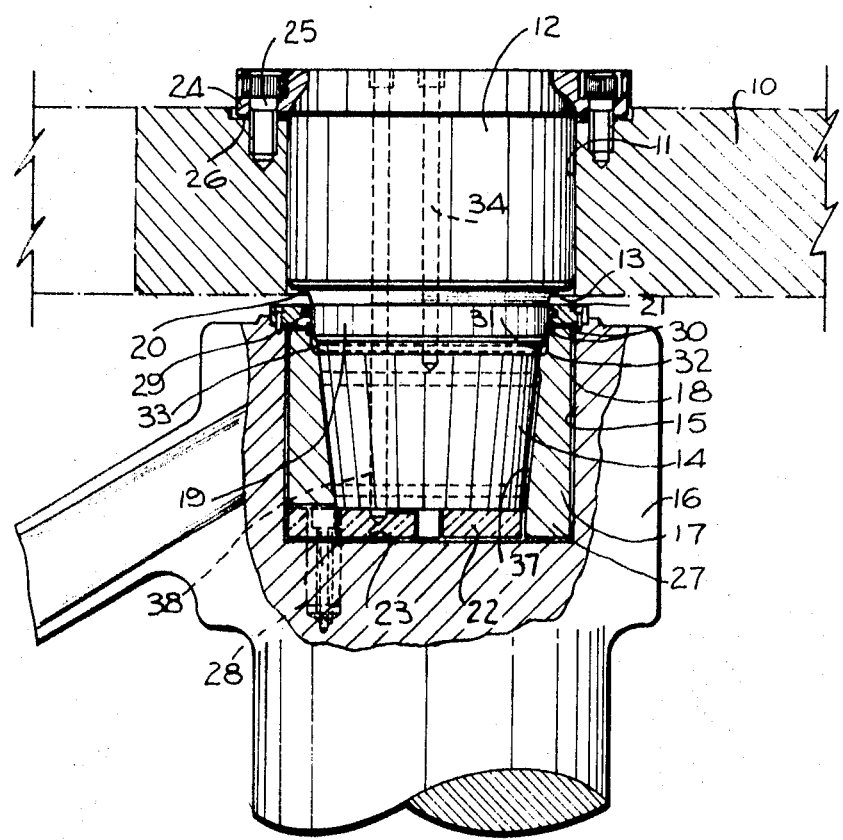
FIG. 1 is a part sectional view of a journal bearing.

The journal bearing shown in FIG. 1 is for connecting a link to a frame, the link being, for example, part of a linkage for connecting a ram to the frame of a press. The frame 10 is provided with a cylindrical opening 11 in which the cylindrical body portion 12 of a pivot pin 13 is located. The pivot pin 13 is fixed against movement relative to the frame 10 and, at one end, the cylindrical body portion 12 of the pivot pin 13 merges into a tapered end portion 14 which is disposed within a cylindrical bearing opening 15 in the link 16. The tapered end portion 14 of the pivot pin 13 affords an externally coned portion which is surrounded by a correspondingly internally coned sleeve 17 and the outer periphery of the sleeve is in abutting contact with the wall surface 18 of the bearing opening 15 and the inner periphery of the sleeve is in sliding contact with the surface of the end portion 14 of the pivot pin 13.

The tapered end portion 14 of the pivot pin 13 merges into the body portion 12 thereof through a short cylindrical portion 19 and a radiused shoulder 20. The cylindrical portion 19 is of reduced diameter compared with the body portion 12 and is supported by a bearing ring 21 carried by that face of the link 16 which is directed toward the frame 10, the ring 21 carrying a felt wiper 29.

A thrust pad 22 which serves as a thrust bearing for axial loads is interposed between the inner end face of the tapered end portion 14 of the pivot pin 13 and the base 23 of the bearing opening 15 in the link 16. The opposite end of the pivot pin 13 is formed with a flange 24 which is secured to the frame 10 by bolts and, in order to permit axial adjustment of the bearing assembly, shims 26 can be interposed between the flange 24 and the adjacent face of the frame 10, the shims 26 being held in position by the attachment bolts 25.

The sleeve 17 has a projecting tongue 27 which engages in a recess in the thrust pad 22 to prevent rotation of the sleeve 17 relative to the thrust pad 22 and the thrust pad 22 is itself keyed to the link 26 by dowels 28 so that the sleeve 17 is fixed against rotation relative to the link 16 but is free to move axially relative thereto.

At its outer end, i.e. that remote from the thrust pad 22, the sleeve 17 is formed with an internal peripheral groove and with an external peripheral groove and each of said grooves receives a sealing ring 30. One sealing ring 30 is in sealing engagement with the cylindrical portion 19 of the pivot pin 13 and the other sealing ring 30 is in sealing engagement with the wall surface 18 of the bearing opening 15 in the link 16.

At the junction of the cylindrical portion 19 and the tapered portion 14 of the pivot pin 13, the pin is formed to define an annular shoulder 31 directed towards the base 23 of the bearing opening 15 and the sleeve 17 is formed, adjacent its outer end, with an oppositely facing annular shoulder 32 so that, with the bearing assembly as shown in FIG. 1, an annular space 33 is afforded between the two shoulders 31 and 32. Said annular space 33 serves as a lubricant channel as hereinafter explained.

The pivot pin 13 is provided with a primary oil passage 34 which is disposed centrally thereof and extends through the body portion 12 and the cylindrical portion 19 of the pivot pin 13 to a position somewhat beyond the lubricant channel 33 and the primary oil passage 34 is provided with radial outlets 35 leading to the lubricant channel 33 which is disposed between the inner sealing ring 30 and the base 23 of the bearing opening in the link 16.

When oil is fed under pressure along the primary oil passage 34 and into the lubricant channel 33, the initial supply of oil serves to force the sleeve 17 inwardly against the thrust pad 22 so that the lubricating oil flows freely between the whole of the mating surfaces of the sleeve 17 and the tapered end portion 14 of the pivot pin 13. In order to ensure continuous lubrication of the mating surfaces of the sleeve 17 and the tapered end portion 14 of the pivot pin 13, the sleeve 17 is provided internally, adjacent each end thereof, with an annular oilway 36, the two oilways 36 being joined by a series of axially extending oil grooves 37. In the particular example shown in FIG. 1, the link 16 is intended to be oscillated about the axis of the pivot pin 13 through an angle of 20° and the oil grooves 37 are spaced angularly around the sleeve 17 at intervals of 30°.

The oil fills up the space between the inner end face of the sleeve 17 and the thrust pad 22. The area of the sleeve at the inner end thereof acted on by the oil pressure tending to urge the sleeve outwardly of the bearing opening 15, is greater than the area of the sleeve acted on by the oil pressure in a direction tending to urge the sleeve inwardly of the bearing opening 15 and this differential pressure effect will cause the sleeve 17 to move outwardly of the bearing opening thus returning it into mating contact with the tapered end portion 14 of the pivot pin. This differential pressure effect continuously biases the sleeve outwardly so that any radial wear which takes place between the sleeve 17 and the tapered end portion 14 of the pivot pin is automatically taken up. The oil supply to the primary oil passage 34 can be obtained from a plunger-type pump delivering oil to the bearing assembly under a cyclically varying pressure and the pivot pin 13 is provided with a further oil passage 38 which extends axially for the full length thereof, the further oil passage 38 being connected to a reservoir for lubricating fluid from which the fluid is fed under pressure to ensure lubrication of the thrust bearing afforded by the thrust pad 22.

In use, the pivot pin 13 is held against movement relative to the frame 10 and the link 16, together with the sleeve 17 keyed thereto by the tongue 27 and the thrust pad 22, can move angularly around the tapered end portion 14 of the pivot pin 13. The sleeve 17 is permanently biased into engagement with said tapered end portion 14 by the oil pressure so as to take up any radial wear and such oil also serves to lubricate the mating surfaces of the sleeve 17 and the pivot pin 13. A long-life compensating journal bearing assembly of simple construction is thus provided.

Extensive tests have shown that the preferred angle of cone for the tapered end portion 14 of the pivot pin 13 and for the sleeve 70 is an included angle of 10° and on test such a bearing assembly was loaded with a pressure of 3,200 pounds per square inch and after a run of 394,000 cycles during each of which the link 16 was oscillated through an angle of 20° relative to the frame 10, the radial sleeve movement was 0.0003 inches, the sleeve having an external diameter of approximately 4 inches. Calculations which have been effected indicate that the coefficient of sliding friction between the sleeve 17 and the tapered end portion 14 of the pivot pin 13 is approximately 0.018.

If desired, a spring (not shown) can be introduced between the inner end face of the sleeve 17 and the base 23 of the bearing opening 15 to apply a spring force to the sleeve additionally biasing it outwardly of the bearing opening 15.

If desired, the annular oil ways 36 in the tapered sleeve 17 can be omitted and in such case the axial groove 37 will extend from the position shown in FIG. 1 adjacent the larger internal diameter end of the sleeve 17 through to the lower end face of the sleeve.

Figure 2:
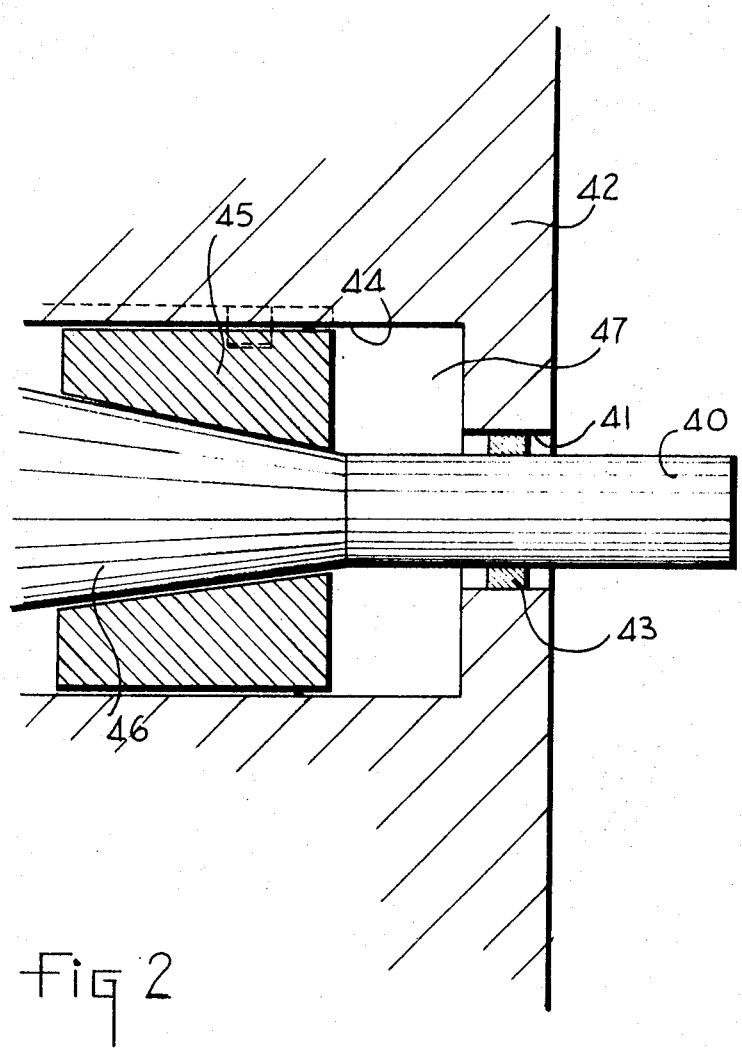
FIG. 2 is a part sectional view of a bearing mounting for a rotatable shaft.

Whilst the invention is primarily applicable and has been specifically designed in relation to a journal bearing as described above, the bearing assembly can be used as a shaft bearing, such an application being illustrated somewhat schematically in FIG. 2.

As shown in FIG. 2 a rotatable shaft 40 is supported in a bore 41 in a housing 42 and a sealing ring 43 is interposed between the shaft 40 and the wall of the bore 41. The housing 42 is also formed to define a larger diameter bore 44 in which an internally tapered sleeve 45 is mounted and the sleeve surrounds an externally coned part 46 of the shaft 40. The sleeve 45 and the coned part 46 having mating engaging frustoconical surfaces. The sleeve 45 is keyed to the housing 41 so as to prevent the sleeve from rotating relative to the housing but so as to permit the sleeve to move axially relative to the housing.

A sealing ring 48 is interposed between the outer surface of the sleeve 45 and the bore 44 so as to define, between the larger surface area end face of the sleeve 45 and the face of the bore 44, a cavity 47 into which oil under pressure is fed through a conduit (not shown), the supply of oil under pressure biasing the sleeve 45 in a direction away from the base of said bore 44 so as to take up any radial wear between the mating surfaces of the sleeve 45 and the coned portion 46 of the shaft 40 thus maintaining the shaft 40 accurately centered relative to the bores 41 and 44.

I claim:
1. A bearing assembly comprising a fixed pivot pin and a link having a bearing opening within which the pin is received, the pin having an externally coned portion, a correspondingly internally coned sleeve being positioned within said bearing opening and fixed against rotation relative to the link but movable axially relative thereto, the sleeve providing a bearing for the coned portion of the pivot pin, means being provided for supplying fluid under pressure to act on the sleeve to bias it into bearing engagement with the coned portion so as to take up radial wear therebetween and the bearing opening having a closed end, a thrust pad being located against said closed end, means being provided to prevent the thrust pad from rotating relative to the bearing opening and means being provided to prevent the sleeve from rotating relative to the thrust pad.

2. A bearing assembly including a pivot pin and an outer member having a closed-ended bearing opening within which the pivot pin is located and from which the pivot pin projects, the pivot pin having an externally coned portion, a correspondingly internally coned sleeve being positioned within the bearing opening of the outer member and being fixed against rotation relative to the outer member but being movable axially relative thereto, the sleeve providing a bearing for the coned portion of the pivot pin and means being provided for feeding lubricating oil under pressure between the opposed conical surfaces of the coned portion and the sleeve to act on the sleeve to bias it into bearing engagement with said coned portion so as to take up radial wear therebetween.

3. A bearing assembly according to claim 2 wherein the pivot pin is formed with conduit means for the supply of the fluid.

4. A bearing assembly according to claim 3 wherein a lubrication channel is provided between the sleeve and the pivot pin at that end of the sleeve which is of the greatest internal diameter.

5. A bearing assembly according to claim 4 wherein the sleeve is formed with annular grooves interconnected by axial grooves for the flow of the fluid.

6. A bearing assembly according to claim 3 wherein said conduit means includes a conduit extending for the full length of the pivot pin.